S. G. WINGQUIST.
BEARING.
APPLICATION FILED MAY 7, 1912.

1,257,774.

Patented Feb. 26, 1918.
2 SHEETS—SHEET 1.

WITNESSES:

INVENTOR
Sven Gustaf Wingquist

BY

Attorney

S. G. WINGQUIST.
BEARING.
APPLICATION FILED MAY 7, 1912.

1,257,774.

Patented Feb. 26, 1918.
2 SHEETS—SHEET 2.

WITNESSES:
A. C. Abbott
J. W. Wiman

INVENTOR
Sven Gustaf Wingquist
BY
Attorney

UNITED STATES PATENT OFFICE.

SVEN GUSTAF WINGQUIST, OF GOTTENBORG, SWEDEN, ASSIGNOR, BY MESNE ASSIGN-
MENTS, TO S. K. F. BALL BEARING COMPANY, OF HARTFORD, CONNECTICUT, A COR-
PORATION OF CONNECTICUT.

BEARING.

1,257,774. Specification of Letters Patent. Patented Feb. 26, 1918.

Original application filed August 28, 1907, Serial No. 390,416. Divided and this application filed May 7,
1912. Serial No. 695,681.

*To all whom it may concern:*

Be it known that I, SVEN GUSTAF WING-QUIST, a subject of the King of Sweden, and a resident of Gottenborg, Sweden, have invented certain Improvements in Bearings, of which the following is a specification.

This invention relates to certain improvements in bearings, and more particularly in bearings of that class or type wherein a certain extent of oscillatory or universal movement is afforded between the bearing members to compensate for defects in alinement and the like, and the object of the invention is, in part, to provide a bearing of this general character of a simple and comparatively inexpensive nature wherein the operative parts are so constructed and arranged as to afford a novel and advantageous distribution of the stresses to which the device is exposed during use with resultant reduction of friction and wear of the parts, and in part to provide a bearing presenting certain features of novelty and improvement which enable the operative parts of the device to be quickly and conveniently assembled and taken down without necessitating any especial or peculiar skill or care upon the part of the operator for assuring the accurate positioning of the bearing members.

The invention consists in certain novel features of the construction, and combinations and arrangements of the several parts of the improved bearing, whereby certain important advantages are attained, and the device is rendered simpler, less expensive and stronger, and otherwise better adapted and more convenient and effective for use, all as will be hereinafter fully set forth.

The novel features of the invention will be carefully defined in the claims.

In order that my improvements may be the better understood, I will now proceed to describe my invention with reference to the accompanying drawings, wherein—

Figure 1 is a face or end view showing a bearing constituting one embodiment of my invention;

Figure 1:
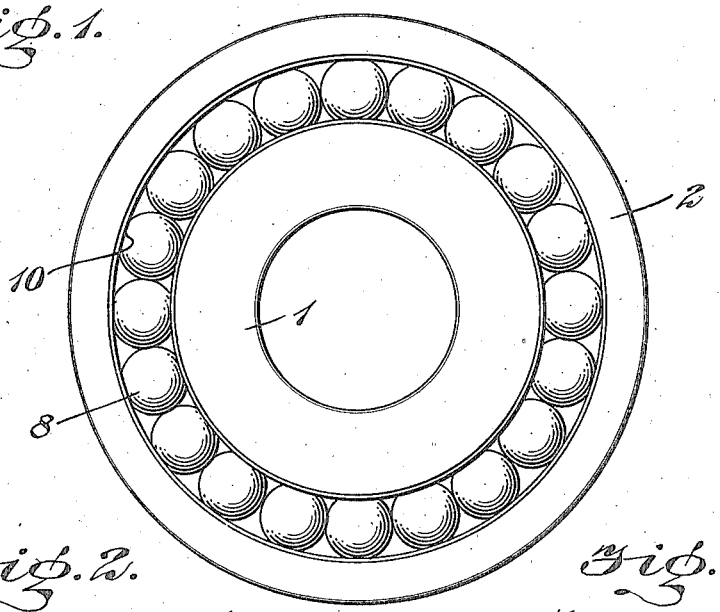

As shown in Figs. 1 to 4, inclusive, of these drawings, the improved bearing, which is a combined radial and thrust bearing, is provided with inner and outer rings or bearing members 1 and 2, the former of which is centrally perforated to permit of being conveniently connected with a shaft or the like, although, if desired, it may be integrally produced upon such shaft. Each of these members 1 and 2 is shown produced from an integral annular part. The outer ring or member 2 has its inner surface provided with circular tracks 3 and 4, which are extended around such inner surface of said member parallel with each other, and which present internal concave relatively concentric spherical unbroken bearing surfaces, which surfaces are preferably permanently related and in the illustration are shown integrally connected and struck from a common center point 5, positioned at the rotative axis of the inner member 1, and which will be referred to hereinafter as the center of oscillatory movement, or oscillatory center of the improved bearing.

Figure 2:
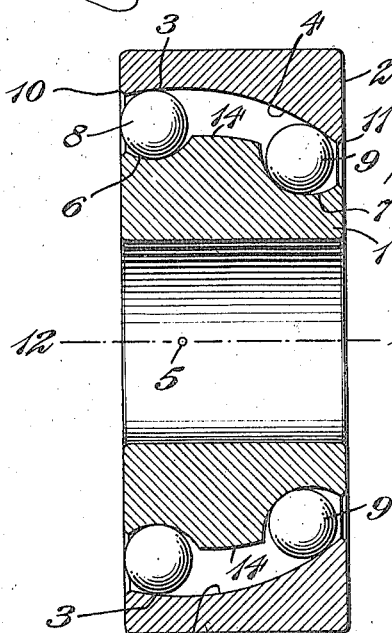
Fig. 2 is a transverse section taken axially through the bearing constructed as shown in Fig. 1.
Figure 3:
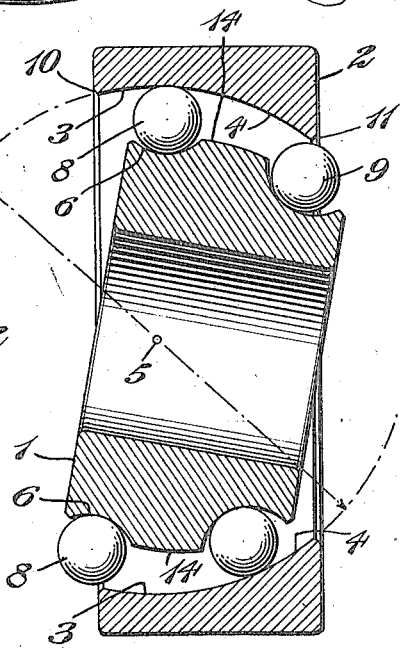
Fig. 3 is a sectional view somewhat similar to Fig. 2, but showing the members of the bearing adjusted at angles one to the other to facilitate the insertion or removal of the interposed balls;
Figure 4:
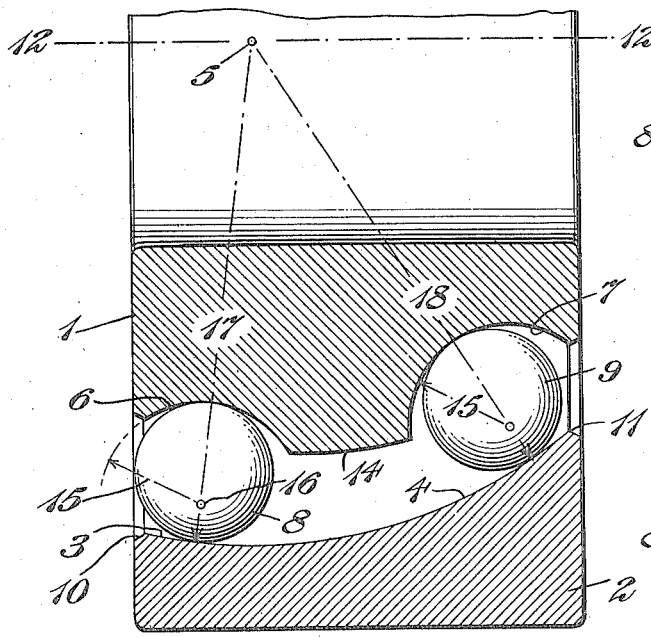
Fig. 4 is an enlarged fragmentary sectional view illustrating certain features of construction of the improved bearing which will be more particularly referred to hereinafter, and

The bearing it will be seen is not symmetrical on both sides of a plane perpendicular to the axis of rotation of the bearing at the point 5, the bearing being somewhat extended at one end, the right-hand end in Figs. 2, 3 and 4. The said point 5 should, however, be located within the bearing on the center line 12 or axis of rotation.

The inner bearing member 1 is of a diameter sufficiently small to permit of being turned or oscillated freely within the outer member 2 and around the oscillatory center 5, and is provided in its perimetral surface with spaced unbroken grooves or tracks 6 and 7, adjacent to the opposite faces or ends of the bearing and adapted to be traversed by the balls of the respective sets or series 8 and 9, and of such conformation and arrangement as to extend concentric with respect to the parti-spherical tracks or bearing surfaces 3 and 4 of the outer member so as to be adapted to hold the respective ball sets or series 8 and 9 in accurate and secure engagement therewith when the parts of the bearing are in assembled relation. The grooves 6 and 7 form unbroken tracks for the balls, which tracks are preferably permanently related and in the illustration are shown integrally connected, and are of unequal radius from the axis of rotation of the bearing. These grooves form a pair of circular concave running faces struck from centers on the rotative axis of the inner member having unequal radii from said axis.

The oscillatory center 5 is positioned in the rotative axis of the inner member at one side of the center of the thickness of the improved bearing but in a plane perpendicular to said axis and between the respective ball sets or series 8 and 9, whereby it will be seen that those portions 10 and 11 of the respective parti-spherical tracks or bearing surfaces 3 and 4 of the outer member 2 which are adjacent to the ends of the improved bearing are nearer to the rotative axis of the inner member, indicated at 12 upon the drawings, that is the axis of rotation of the bearing than those portions of such parti-spherical tracks or bearing surfaces which are more nearly central of the thickness of the bearing. The center point 5 is positioned on the said axis of rotation within the bearing, and nearer the plane of one ball set than that of the other. The center point 5 is preferably nearer the center of the larger running face than to that of the shoulder running face.
It may therefore be said that these marginal or lateral portions 10 and 11 of the tracks or bearing surfaces of the outer member afford annular inwardly directed flanges or projections at the opposite ends of the bearing, within which the ball sets or series 8 and 9 are securely confined when the parts are in assembled relation, and the portion 14 of the inner member 1 between the ball sets or series also affords at its opposite sides shoulders which are adapted to maintain the balls in relation to the tracks or bearing surfaces of the outer member, so that endwise or axial shifting of the members relatively one to the other is effectively prevented when the parts are assembled.

The perimetral grooves or tracks 6 and 7 of the inner member are rounded in cross section, so that their concave surfaces, as indicated in Fig. 4, conform with curves struck with radii 15 slightly greater than those of the balls of the respective sets or series 8 and 9, from centers 16 positioned in planes extended at angles to each other from the center of oscillatory movement 5 of the bearing through the centers of the balls of the respective sets or series 8 and 9, as indicated at 17 and 18 in said figure.

In this way it will be evident that each ball in each of the sets or series 8 and 9 will have contact with the members 1 and 2 at only two points which are diametrically opposite to each other and alined in the planes 17 and 18 passing through the oscillatory center 5 of the bearing and through the center of such ball, so that friction and wear are substantially eliminated and the balls are caused to travel with a true rolling movement over the tracks or bearing surfaces of the members 1 and 2 during the operation of the device.

The parti-spherical bearing surfaces or tracks 3 and 4 of the outer bearing member being struck with the same radius and from the same center point 5 form substantial continuations of each other, whereby it will be seen that universal or oscillatory movement of the inner member and of the ball sets or series 8 and 9 is permitted around said oscillatory center 5 and within the outer member 2, during which time the balls of each set or series are retained accurately in engagement with their inner and outer bearing surfaces, so that the improved bearing is enabled to compensate automatically for any ordinary defect of alinement and to accommodate transverse strains placed upon the shaft whereon the inner member is mounted.

The inner member and the ball sets are capable of a tilting movement around the said center point for bringing the balls outside of the outer member. Such movement of the inner member relatively to the outer member facilitates inspection of the balls and the spherical tracks, and the insertion and withdrawal of the interposed balls since when said member 1 is swung or oscillated about the point 5, as for example, to the position shown in Fig. 3, the balls of the respective sets or series 8 and 9 are automatically withdrawn from between the members so that they may be removed from the grooves or tracks of the inner member or replaced therein at will, whereby repairs may be readily effected in case the balls become worn or broken and the assembling of the members is greatly facilitated.

By the construction and arrangement of the parts shown in Figs. 1 to 4, inclusive, it will be apparent that during the use of the improved bearing stress is not applied to the outer member 2 in directions perpendicular to the rotative axis 12, but in the directions of the planes 17 and 18 divergent from the oscillatory center 5 in which the contacting points of the balls with the inner and outer members are situated, whereby the stress imposed upon the parts is more evenly and uniformly distributed, and by reason of the positioning of the oscillatory center 5 at one side of the center of the thickness of the bearing, the direction in which transverse stress is applied to the ball set or series 8 is at a greater angle to a perpendicular from the rotative axis 12 than the direction in which such stress is applied to the balls of the set or series 9. The respective ball sets are adapted to resist predetermined unequal radial pressures along radial lines passing through the center point 5 and said circular running faces.

In proportion to the inequality of the angles made by the planes 17 and 18 with a perpendicular to the rotative axis, the ball set or series 9 will be subjected to less transverse stress than the balls of the series 8, and advantage is taken of this fact to employ a less number of balls in said set or series 9, whereby a material simplification and reduction in cost is attained, while at the same time the balls of said set or series 9 are better adapted to resist end-thrust than those of the set or series 8, whereby a further advantage is attained rendering the improved bearing particularly well adapted for use in situations where considerable thrust is imposed upon the shaft.

The improved bearing constructed according to my invention is of an extremely simple and comparatively inexpensive nature, and is particularly well adapted for use by reason of its strength and of the facility with which its parts may be assembled and taken down, and of the substantially automatic manner in which compensation is afforded for irregularities in the movement or alinement of the shaft, and it will also be obvious from the above description that the bearing is susceptible of some modification without material departure from the principles and spirit of the invention, and for this reason I do not desire to be understood as limiting myself to the precise formation and arrangement of the several parts herein set forth in carrying out my invention in practice.

Figure 5:
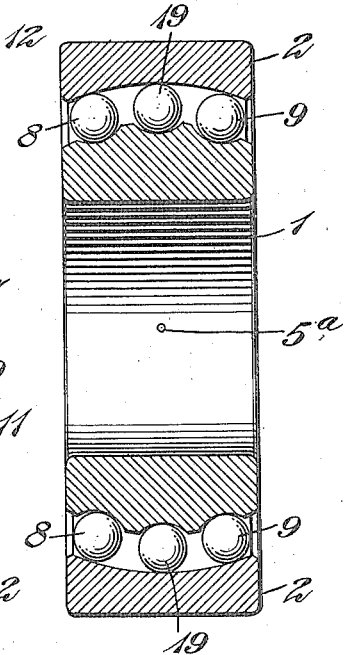
Fig. 5 is a transverse sectional view somewhat similar to Fig. 2, but illustrating another embodiment of my present invention.

For example, in some cases the construction shown in Fig. 5 may be adopted with good results, this construction being similar to that above described, excepting that the oscillatory center 5ª is positioned midway of the thickness of the bearing, and the bearing surfaces of the inner and outer members, as well as the interposed ball sets or series are symmetrically arranged at opposite sides thereof, while a third ball set 19 is centrally positioned between said inner and outer members, having its balls engaged between the parti-spherical concave surface of the outer member and a groove or track in the inner member.

The three ball set structure herein described and illustrated in Fig. 5, and the features therein shown by way of illustration of a bearing constructed for resisting axial thrust in both directions is claimed in my copending and division application, Serial No. 212,725, filed January 19, 1918, for ball bearings.

Having thus described my invention, what I claim and desire to secure by Letters Patent is:

1. The herein described improved ball bearing having an inner member provided with grooves forming a plurality of oppositely arranged shoulders, a plurality of ball sets arranged in said grooves of the inner member, and an outer member having a concave spherical inner surface struck from an oscillatory center positioned at the rotative axis of the inner member within the bearing and to one side of a plane centrally disposed between the ball sets, and affording concentric tracks having spherical bearing surfaces reversely inclined to the rotative axis of the inner member and opposite to the shoulders afforded by the respective grooves of the inner member, the respective ball sets being interposed between said shoulders of the inner member and the respective reversely inclined bearing surfaces of the outer member to transmit end thrust imposed upon said inner member, and said inner member being capable of universal turning movement around said oscillating center to facilitate the introduction and withdrawal of the balls within and from said outer member.

2. A combined radial and thrust bearing comprising an inner and an outer bearing member, the inner bearing member having two grooves forming unbroken tracks of unequal radius from the axis of rotation of the bearing, a ball set mounted on each track, and the outer member having hollow spherical unbroken tracks for said balls struck from a center point positioned on the said axis within the bearing and nearer the plane of one ball set than that of the other, the said inner member and the ball sets being capable of a tilting movement around the said center point to bring the balls outside the outer member.

3. A combined radial and thrust bearing comprising an inner and an outer bearing member, the inner bearing member having two grooves forming unbroken and integrally connected tracks of unequal radius from the axis of rotation of the bearing, a ball set mounted on each track, and the outer member having hollow spherical unbroken and integrally connected tracks for said balls struck from a center point positioned on the said axis within the bearing and nearer the plane of one ball set than that of the other, the said inner member and the balls being capable of a tilting movement around the said center point to bring the balls outside the outer member.

4. In a ball bearing the combination of an inner bearing member provided with a pair of circular concave running faces, struck from centers on the rotative axis of said member and having unequal radii from said axis, a pair of ball sets located on said faces, and an integral, concave, outer spherical running face, with which said ball sets contact, struck from a point also located on said axis but nearer to the center of the larger running face than to that of the smaller running face, whereby the respective ball sets may resist predetermined unequal pressures along radial lines passing through said point and said circular running faces.

5. In a ball bearing the combination of an inner bearing member provided with a pair of concave circular unbroken tracks struck with unequal radii from centers located on the axis of rotation of said member, a ball set located on each of said tracks, and an outer ring having a concave, integral, spherical running face with which said ball sets contact, said face struck from an oscillating center also located on said axis, but nearer the center of the running face having the greater radius than to that of the running face having the smaller radius, whereby said ball sets may resist unequal predetermined pressures along lines passing through each track and said oscillating center, and whereby said inner member and ball sets will be capable of a tilting movement around said oscillating center.

6. A combined radial and thrust bearing comprising an inner and an outer bearing member, the inner bearing member having two grooves forming unbroken tracks of unequal radius from the axis of rotation of the bearing, a ball set mounted on each track, and the outer member having hollow spherical unbroken and permanently related tracks for said balls struck from a center point positioned on the said axis within the bearing and nearer the plane of one ball set than that of the other, the said inner member and the ball sets being capable of a tilting movement around the said center point to facilitate the introduction and withdrawal of the balls.

7. A combined radial and thrust bearing comprising an inner and an outer bearing member, the inner bearing member having two grooves forming unbroken and permanently related tracks of unequal radius from the axis of rotation of the bearing, a ball set mounted on each track, and the outer member having hollow spherical unbroken tracks for said balls struck from a center point positioned on the said axis within the bearing and nearer the plane of one ball set than that of the other, the said inner member and the balls being capable of a tilting movement around the said center point to facilitate the introduction and withdrawal of the balls.

8. A combined radial and thrust bearing comprising an inner and an outer bearing member, one of which is formed with a spherical face struck from a center on the axis of rotation of the bearing, and the other of which is formed with two tracks opposed to the said spherical face, and a ball set on each track, the points of contact of said balls with the bearing members being on lines radiating from the said center at angles to the axis of rotation of the bearing, said angles for one ball set being unequal to those for the other ball set.

9. A combined radial and thrust bearing comprising an inner and an outer bearing member, each of these being formed with two tracks of equal radius from a common oscillatory center located between the planes of the said tracks and nearer the plane of one track than of the other, the tracks of one of the said members being spherical, and a ball set on each track.

10. A combined radial and thrust bearing comprising an inner and an outer bearing member, each of these being formed with two tracks of equal radius from a common oscillatory center located between the planes of the said tracks and nearer the plane of one track than of the other, the tracks of one of the said members being spherical, and the tracks of the other member being grooved, and a ball set on each track.

11. A ball bearing for withstanding radial and end thrusts, and comprising inner and outer track bearing members one of which has spherical tracks, and between which members there is relative rotation and relative oscillation about a common center, and two ball sets mounted upon said tracks and unsymmetrically disposed in respect of a radial axis passing through the center of oscillation.

12. A ball bearing for withstanding radial and end thrusts, and comprising inner and outer track bearing members one of which has spherical tracks, and between which members there is relative rotation and relative oscillation about a common center, and two ball sets mounted upon said tracks and unsymmetrically disposed in respect of a plane perpendicular to the rotative axis passing through the center of oscillation, the ball sets being so disposed that the balls in each set transmit stress only in a direction radiating from such oscillatory center.

13. In a ball bearing comprising inner and outer track bearing members, the outer track being spherical in formation and the inner member being formed with two ball tracks of unequal radius, and a ball set upon each of said tracks, the inner member being oscillatory upon a point in its axis of rotation, whereby the track members may be relatively oscillated to facilitate the introduction and withdrawal of the balls, said track members being so shaped at their outer edges that relative axial displacement of the two members in either direction is prevented.

14. A ball bearing comprising two rows of balls arranged between an outer track which is spherical and an inner track which is formed with two concave running faces, the angle between the center line of the inner track and the direction of pressure upon a ball in one of the rows being of different magnitude from the angle between said center line and the direction of pressure upon a ball in the other row.

15. A ball bearing comprising two ball sets and an inner and an outer member therefor, said inner member being formed with race grooves and being movable about a center of motion located within the bearing, and in such position that the race grooves for the two ball sets lie outside of and on opposite sides of but unsymmetrical to a plane intersecting said center of motion and perpendicular to the axis of rotation.

In witness whereof I have hereunto signed my name in the presence of two subscribing witnesses.

SVEN GUSTAF WINGQUIST.

Witnesses:
ALOF PALM,
AUG SORENSEN.